July 26, 1955          C. O. TROUT          2,713,852
OPPOSED PISTON INTERNAL COMBUSTION ENGINE FRAME STRUCTURE
Filed Dec. 29, 1950          2 Sheets-Sheet 1

INVENTOR.
CLARENCE O. TROUT
BY Edward M. Apple
ATTORNEY

# United States Patent Office 2,713,852
Patented July 26, 1955

2,713,852

OPPOSED PISTON INTERNAL COMBUSTION ENGINE FRAME STRUCTURE

Clarence O. Trout, Detroit, Mich.

Application December 29, 1950, Serial No. 203,382

6 Claims. (Cl. 121—194)

This invention relates to internal combustion engines and has particular reference to an engine of the opposed piston type.

An object of the invention is to generally improve internal combustion engines and to provide an engine construction which is simple in design, economical to manufacture, easy to assemble and disassemble, and one in which the parts are readily accessible for adjustment, replacement or repair.

A further object of the invention is to provide an engine construction which is suitable for use with high compression ratios and low grade fuels.

Another object of the invention is to provide an engine of the reciprocating piston type, which is constructed and arranged with inherent qualities of static and dynamic balance, whereby its performance is smooth and practically vibrationless.

Another object of the invention is to provide an engine of high output capacity, which is exceedingly light in weight and has relatively small overall dimensions.

Another object of the invention is to provide an engine assembly which has novel cylinder block, cylinder head, valve, bearing support and cam housing construction and arrangement.

Another object of the invention is to provide an opposed piston type engine which is formed with a pair of matched interchangeable cylinder blocks.

A further object of the invention is the provision of an engine of the character indicated which employs a novel crank shaft and piston arrangement.

A still further object of the invention is to provide an engine of the character indicated, which is constructed with a pair of end plate structural members which are adapted to serve as bearing supports and as structural members for transmitting loads back and forth between the cylinder blocks and between the crank shaft bearings and the cylinder blocks.

Another object of the invention is to provide an engine of the character indicated which is provided with a pair of end plates which, together with the cylinder blocks, form a box-like structure which is light in weight yet very rigid.

Another object of the invention is to provide an engine of the character indicated, which is provided with a pair of end plates arranged to assist in locating and positioning the cylinder blocks and serve as supporting means for mounting the engine on a vehicle or the like.

Another object of the invention is to provide an engine of the character indicated, which is provided with matched cylinder blocks and heads which are constructed and arranged so that there is a wiping action between the contacting surfaces during the assembling of the parts.

A still further object of the invention is to provide an engine with simultaneous expansion cylinders and common combustion chamber arrangement which is highly efficient in operation and is easily cooled.

A still further object of the invention is to provide a combustion chamber which has a novel valve and spark plug arrangement.

The foregoing and other objects and advantages of the invention will become more apparent as the description proceeds, reference being made from time to time to the accompanying drawings, forming part of the within disclosure, in which drawings.

Figure 1:
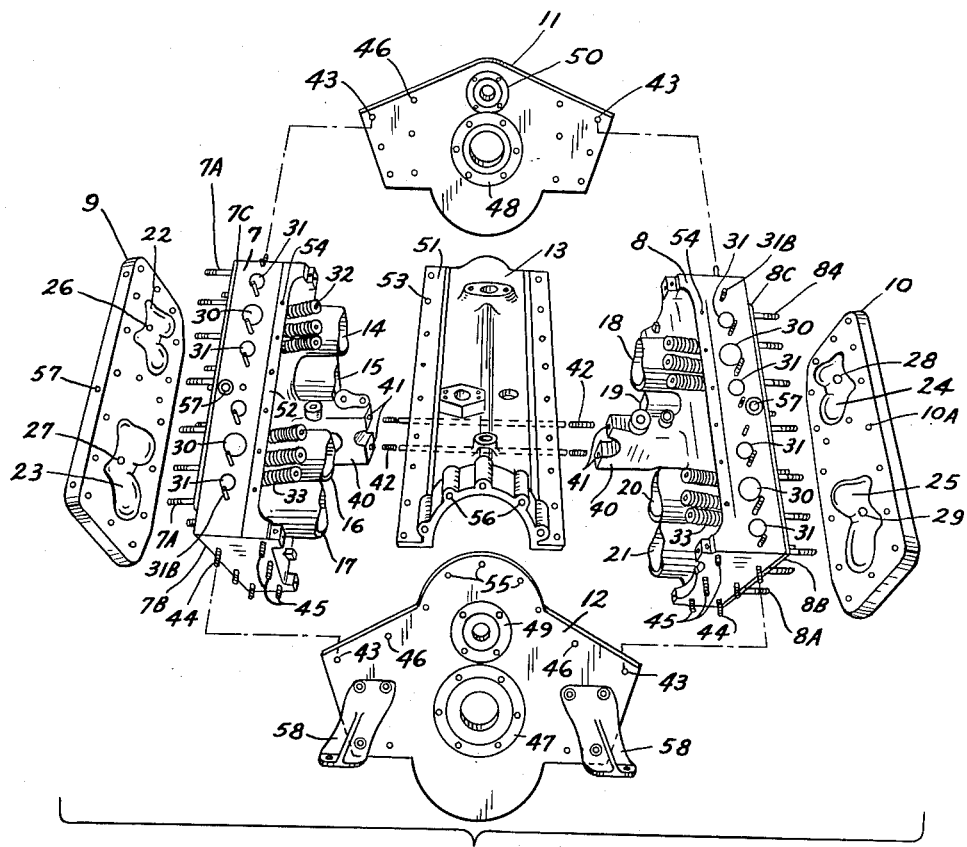
Fig. 1 is a blown-up perspective view of certain of the principal parts of the device embodying the invention.

Referring now more particularly to the drawings, it will be understood that in the embodiment herein disclosed, the reference characters 7 and 8 indicate a pair of matched interchangeable cylinder blocks, the reference characters 9 and 10 indicate the cylinder heads, the reference characters 11 and 12 indicate the structural end plate members, and the reference character 13 indicates the cam shaft housing. The cylinder blocks 7 and 8 as indicated above are identical castings, which may be cast in production at a fraction of the cost of conventional engine cylinder blocks of the same horsepower rating, because of their small size and light weight. The total weight of the two cylinder blocks for an 80 horsepower engine weigh approximately 78 pounds as against the weight of 250 pounds of a conventional cylinder block for an 80 horsepower engine.

In addition to these savings, this construction has other advantages in that it permits a given block to be used on either the left or the right side of the engine. This feature further reduces the cost as only one type of casting and similar machining operations are necessary; and since the blocks are small and light in weight, they may be easily handled by the operator or mechanic in assembling the engine; and if one of the blocks is found faulty or becomes damaged during the foundry or machining operations, it necessitates the scrapping of only one-half of the material which would otherwise be scrap. The blocks 7 and 8 and the heads 9 and 10 are secured together in part by means of the studs 7A and 8A which engage suitable openings 9A and 10A formed in the heads. It will be noted that the blocks 7 and 8 are formed with angular faces 7B and 8B, against which faces are positioned the gaskets 7C and 8C. It will also be noted that the studs 7A and 8A are positioned with end axes parallel to the axes of the cylinders hereinafter described. This is an important feature of the invention as it provides a wiping action between the surfaces of the gaskets and the heads when the heads are inserted on the studs. It also provides maximum strength to the block and head assembly, inasmuch as the studs are positioned parallel with the working forces during the operation of the engine.

The cylinder blocks 7 and 8 are provided with cylinders 14, 15, 16, 17, 18, 19, 20 and 21, the cylinders in one block being arranged in opposed relation with respect to the cylinders in the other block. The cylinders in each block are arranged in pairs for simultaneous expansion, so that each pair is served by a common combustion chamber formed in the head. For example, the cylinders 14 and 15 are served by the common combustion chamber 22 formed in the head 9, and the cylinders 16 and 17 are served by the common combustion chamber 23 formed in the head 9. By the same token, the cylinders 18 and 19 are served by the combustion chamber 24 formed in the head 10, and the cylinders 20 and 21 are served by the common combustion chamber 25 formed in the head 10. This permits the use of a smaller number of valves and spark plugs.

In this embodiment I employ one intake valve and two exhaust valves for each of the combustion chambers 22, 23, 24 and 25, and I employ but a single spark plug for each of the combustion chambers 22, 23, 24 and 25. The spark plugs are positioned respectively in the threaded openings 26, 27, 28 and 29 of the heads 9 and 10. Each block 7 and 8 is provided with intake ports 30 and exhaust ports 31 which are opened and closed by suitable valves (Fig. 2), the latter being actuated by the springs 33 and tappets 33A, cams 34, and cam shaft 35 (Fig. 2) as in conventional practice. Each block is provided with exhaust manifolds 31A and intake manifolds (not shown) which are secured to the blocks by means of studs 31B.

Figure 2:
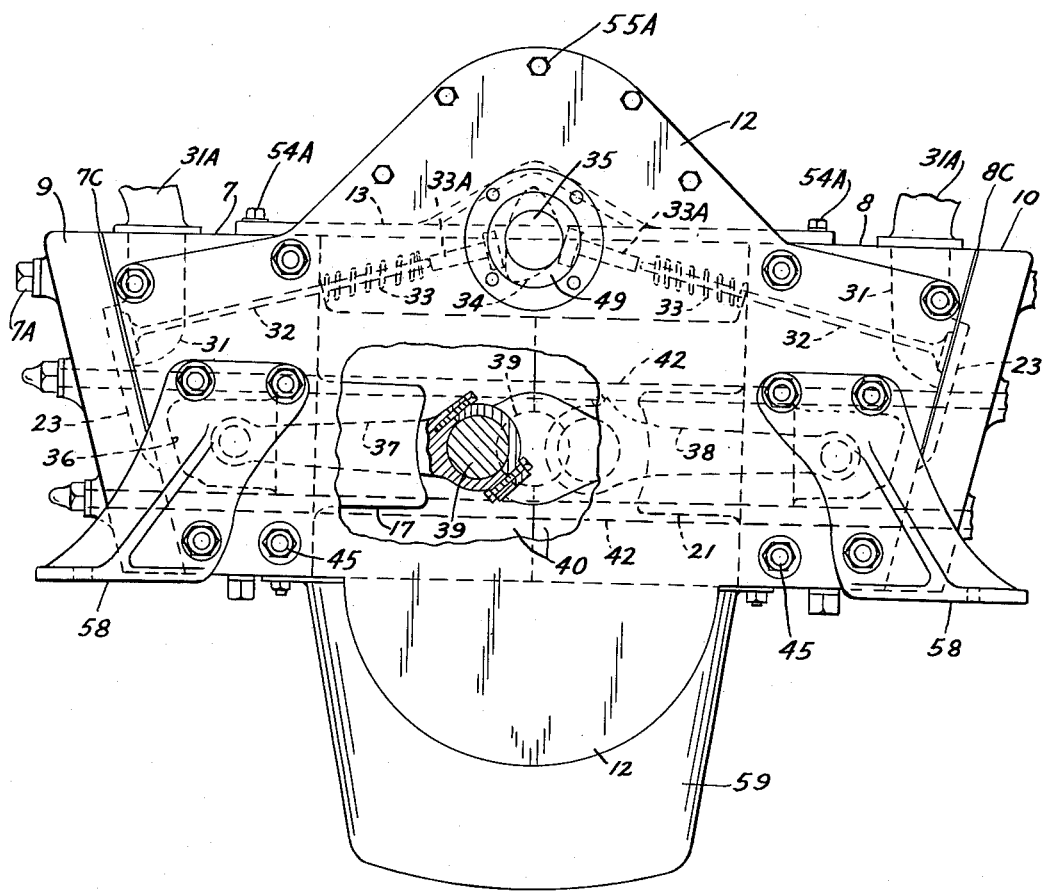
Fig. 2 is an end view of the device embodying the invention, with parts broken away and parts in section.

Each cylinder is provided as shown in Fig. 2 with a piston 36 and a connecting rod 37, the rods 37 and 38, etc., being connected to the crank shaft 39. Each of the blocks 7 and 8 is provided with a centrally positioned extension member 40 which, when machined out as shown in Fig. 1, serves as the central bearing for the crank shaft 39. The extension members 40 are provided with longitudinal bores 41 which extend clear through the cylinder blocks and heads and are adapted to accommodate the tie rods 42 which assist in holding the assembled blocks and heads against displacement. The rods 42 help to hold the blocks, cylinder heads and gaskets together. They force the extensions 40 of the blocks together and hold the central crank shaft bearing against movement. They also serve as pilots and hold the faces of the crank shaft bearing in alignment and exert enough pressure on the faces of the bearing to prevent lubricating oil from escaping from the central crank shaft bearing; and in addition to those functions, they transmit operating loads from one side of the engine to the opposite side. The blocks 7 and 8 are tied together at their ends by means of the end plates 11 and 12 which are provided with holes 43 which are adapted to accommodate the studs 44 carried in the ends of the blocks 7 and 8.

In order to facilitate the locating and assembling of the blocks 7 and 8 and the end plates 11 and 12, and to further reenforce the engine structure, I also provide dowels 45 which engage holes 46 formed in the end plates. When the blocks 7 and 8 and the end plates 11 and 12 are assembled together as herein described, a light-weight, rigid box-like structure results. The plates 11 and 12 and the dowels 45 are main structural members and are adapted to space the blocks and to transmit loads back and forth between the blocks and back and forth between the crank shaft bearings and the blocks.

In addition to serving as structural members, the end plates 11 and 12 also serve as means for supporting the end bearings 47 and 48 for the crank shaft 39 and the end bearings 49 and 50 for the cam shaft 35. The cam shaft 35 is covered by means of a housing 51, the sides of which respectively engage the surfaces 52 of the cylinder blocks 7 and 8, to which the housing is secured by means of machine screws 54A or the like which engage the openings 53 formed in the housing 51 and the holes 54 formed in the blocks 7 and 8. The cam housing 51 is also secured to the end plate 12 by means of machine screws or bolts 55A which extend through the openings 55 formed in the end plate 12 and the openings 56 formed in the housing 51. The housing 51 also supports the valve tappets 33A and a bearing element for the cam shaft 35 (Fig. 2).

It will be understood, of course, that the cylinder blocks 7 and 8 and the cylinder heads 9 and 10 are provided with suitable water cooling passageways 57 as in conventional practice.

The end plates 11 and 12 are provided with mounting feet 58, whereby the engine may be mounted to a vehicle or the like. The engine is provided with a suitable oil pan 59.

Although I have herein disclosed practically all of the elements of a complete internal combustion engine, it will be understood that I intend only to claim certain structures in this application.

Having described my invention what I claim and desire to secure by Letters Patent is:

1. In an engine of the character described in combination, a pair of matched cylinder blocks, and a pair of structural plates secured to and extending across the ends of said blocks, whereby said blocks are supported throughout their entire end areas in spaced relation to each other, each of said cylinder blocks having multiple cylinder bores, and having a centrally positioned integral extension member adapted to serve as one half of a crankshaft bearing, there being parallel bores in said extension members on opposite sides of said bearing, and tie rods in said bores, whereby said cylinder blocks and the central crankshaft bearing are integrated into a unitary structure.

2. In an engine of the character described in combination, a pair of matched cylinder blocks and a pair of structural plates secured to and extending across the ends of said blocks, whereby said blocks are supported throughout their entire end areas in spaced relation to each other, there being a single crankshaft and a single cam shaft bearing element carried by each of said end plates.

3. In an engine of the character described in combination, a pair of matched cylinder blocks, and a pair of structural plates secured to and extending across the ends of said blocks, whereby said blocks are supported throughout their entire end areas in spaced relation to each other, there being a longitudinally directed housing member covering the cam shaft space between said pair of blocks, said housing member being secured along each side to one of said blocks, and said housing member supporting the valve tappets for said engine, and providing a bearing element for the cam shaft.

4. In an engine of the character described in combination, a pair of identical blocks arranged in spaced relation, each block having pairs of closely related cylinder bores therein, pistons in each pair of bores reciprocating therein in unison, the pistons in opposite blocks being out of alignment, structural members in the form of plates joining the ends of the blocks and supporting said blocks throughout their entire end areas, and a housing member secured to the tops of said blocks and covering the space therebetween, each of said structural end members being provided with a single crank shaft bearing element, and a single camshaft bearing element.

5. In an engine of the character described in combination, a pair of identical blocks arranged in spaced relation, each block having pairs of closely related cylinder bores therein, pistons in each pair of bores reciprocating therein in unison, the pistons in opposite blocks being out of alignment, structural members in the form of plates joining the ends of the blocks and supporting said blocks throughout their entire end areas, and a housing member secured to the tops of said blocks and covering the space therebetween, each block being provided with an extension member machined to form one-half of an integral central bearing, bores extending through said blocks and said extension members, and tie rods extending through said bores.

6. In an engine of the character described in combination, a pair of identical blocks arranged in spaced relation, each block having pairs of closely related cylinder bores therein, pistons in each pair of bores reciprocating therein in unison, the pistons in opposite blocks being out of alignment, structural members in the form of plates joining the the ends of the blocks and supporting said blocks throughout their entire end areas, and a housing member secured to the tops of said blocks and covering the space therebetween, each structural end member being provided with mounting brackets and a single cam shaft bearing element and a single main crankshaft bearing element, said brackets being spaced from the said crankshaft bearing element.

(References on following page)

References Cited in the file of this patent

UNITED STATES PATENTS

| | | |
|---|---|---|
| 695,824 | Motsinger | Mar. 18, 1902 |
| 1,240,761 | Murnane | Sept. 18, 1917 |
| 1,254,281 | Salway | Jan. 22, 1918 |
| 1,270,124 | Davidson | June 18, 1918 |
| 1,276,891 | Felix | Aug. 27, 1918 |
| 1,710,721 | Bosmans | Apr. 30, 1929 |
| 1,756,796 | Noble | Apr. 29, 1930 |
| 1,824,992 | Harroun | Sept. 29, 1931 |
| 1,914,793 | Szydlowski | June 20, 1933 |
| 1,979,075 | Meyer | Oct. 30, 1934 |
| 1,980,924 | McDonald | Nov. 13, 1934 |
| 2,170,099 | Stubings | Aug. 22, 1939 |
| 2,290,202 | Nelson | July 21, 1942 |
| 2,428,886 | MacPherson | Oct. 14, 1947 |